United States Patent

Suzuki

[15] 3,646,332

[45] Feb. 29, 1972

[54] BINARY ADDER AND/OR SUBTRACTION USING EXCLUSIVE LOGIC

[72] Inventor: Yasoji Suzuki, Kawasaki-shi, Japan

[73] Assignee: Tokyo Shibaura Electric Co., Ltd., Kawasaki-shi, Japan

[22] Filed: June 27, 1969

[21] Appl. No.: 837,240

[30] Foreign Application Priority Data

July 3, 1968 Japan....................................43/46035

[52] U.S. Cl...............................................235/176, 307/216

[51] Int. Cl.............................................................G06f 7/50

[58] Field of Search...................................235/176; 307/216

[56] References Cited

UNITED STATES PATENTS

| | | | |
|---|---|---|---|
| 3,001,711 | 9/1961 | Frohman | 235/176 |
| 3,022,951 | 2/1962 | Anderson | 235/176 |
| 3,100,838 | 8/1963 | Szekely | 235/176 |
| 3,196,261 | 7/1965 | Schaefer | 235/176 |

*Primary Examiner*—Eugene G. Botz
*Assistant Examiner*—David H. Malzahn
*Attorney*—Flynn & Frishauf

[57] ABSTRACT

A logical operation circuit device includes a number of exclusive AND/OR logical elements derived from the logical formulas associated with a full added/subtractor. The arrangement provides a full adder/subtractor for operating on one-bit binary digital signals.

10 Claims, 10 Drawing Figures

| A | B | C | S | Ca |
|---|---|---|---|---|
| 0 | 0 | 0 | 0 | 0 |
| 0 | 1 | 0 | 1 | 0 |
| 1 | 0 | 0 | 1 | 0 |
| 1 | 1 | 0 | 0 | 1 |
| 0 | 0 | 1 | 1 | 0 |
| 0 | 1 | 1 | 0 | 1 |
| 1 | 0 | 1 | 0 | 1 |
| 1 | 1 | 1 | 1 | 1 |

| A | B | C | S | Cs |
|---|---|---|---|---|
| 0 | 0 | 0 | 0 | 0 |
| 0 | 1 | 0 | 1 | 1 |
| 1 | 0 | 0 | 1 | 0 |
| 1 | 1 | 0 | 0 | 0 |
| 0 | 0 | 1 | 1 | 1 |
| 0 | 1 | 1 | 0 | 1 |
| 1 | 0 | 1 | 0 | 0 |
| 1 | 1 | 1 | 1 | 1 |

| α | β | γ |
|---|---|---|
| 0 | 0 | 0 |
| 1 | 0 | 1 |
| 0 | 1 | 1 |
| 1 | 1 | 0 |

INVENTOR.
YASOJI SUZUKI
BY

*INVENTOR.*
YASOJI SUZUKI

BINARY ADDER AND/OR SUBTRACTION USING EXCLUSIVE LOGIC

The present invention relates to a logical operation circuit device for carrying out the addition and subtraction of one-bit binary digital signals A and B and more particularly to a full adder/subtractor having a simple arrangement.

The logical operation circuit device basically comprises logical elements performing the functions of OR, AND and NOT and further those carrying out the functions of NAND and NOR which are formed of a combination of the first-mentioned logical elements. However, if a full adder or full adder/subtractor is only composed of such logical elements, then the resultant circuit arrangement will become extremely complicated.

The object of the present invention is to analyze the logical arrangement of the prior art full adder/subtractor to find a common logical element $\gamma=\bar{\alpha}\bar{\beta}+\alpha\beta/\alpha\bar{\beta}+\bar{\alpha}\beta$, and to form a full adder/subtractor using an exclusive AND/OR circuit corresponding to these common logical elements so as to simplify the circuit, thereby providing a logical operation circuit device involving a full adder/subtractor which is inexpensive and has very reliable performance.

The present invention can be more fully understood from the following detailed description when taken in conjunction with the accompanying drawings, in which.

Figures 1A, 1B, 2, 4:
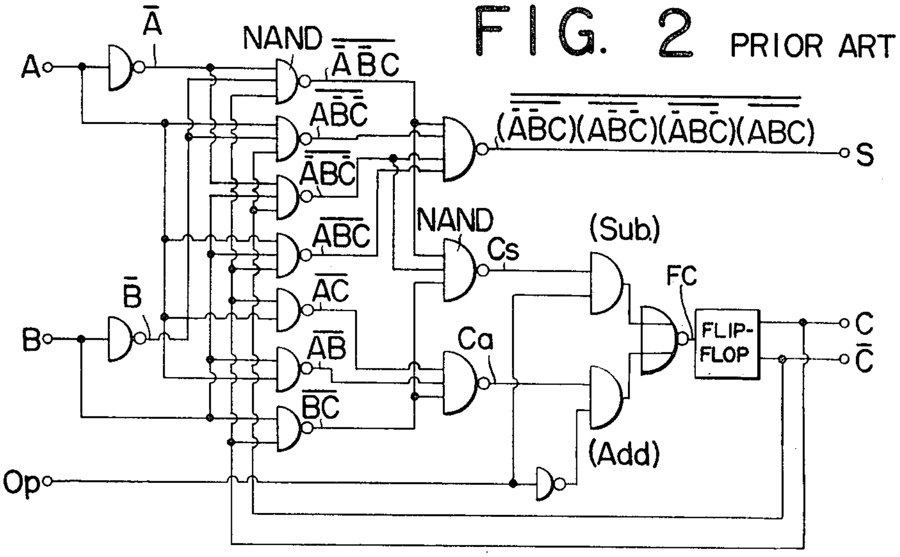
FIG. 1A PRIOR ART
FIG. 1B PRIOR ART
FIG. 2 PRIOR ART
FIG. 1A is the truth table of a full adder.
FIG. 1B is the truth table of a full subtractor.
FIG. 2 illustrates the logical circuit of the prior art full adder/subtractor.
FIG. 4 is the truth table of an exclusive OR circuit used in the full adder/subtractor of FIG. 3.

Referring to FIGS. 1 and 2, the logical arrangement of the prior art full adder/subtractor will be analyzed. This full adder/subtractor comprises a combination of a full adder and full subtractor. The full adder consists of two half adders so as to perform a carrying action, and the full subtractor is formed of two half subtractors so as to carry out a borrowing action. To prepare a logical operation circuit device of a full adder/subtractor, there are first obtained from the truth table of a full adder shown in FIG. 1A and that of a full subtractor shown in FIG. 1B the following logical formula:

$$
\begin{aligned}
S&=\bar{A}\bar{B}C+A\bar{B}\bar{C}+\bar{A}B\bar{C}+ABC\\
&=\overline{\overline{\bar{A}\bar{B}C}}+\overline{\overline{A\bar{B}\bar{C}}}+\overline{\overline{\bar{A}B\bar{C}}}+\overline{\overline{ABC}}\\
&=\overline{(\overline{\bar{A}\bar{B}C})\,(\overline{A\bar{B}\bar{C}})\,(\overline{\bar{A}B\bar{C}})\,(\overline{ABC})} \qquad (1)
\end{aligned}
$$

$$
\begin{aligned}
Ca&=AB\bar{C}+\bar{A}BC+A\bar{B}C+ABC\\
&=AB+BC+CA\\
&=\overline{\overline{AB}}+\overline{\overline{BC}}+\overline{\overline{CA}}\\
&=\overline{(\overline{AB})\,(\overline{BC})\,(\overline{CA})} \qquad (2)
\end{aligned}
$$

$$
\begin{aligned}
Cs&=\bar{A}B\bar{C}+\bar{A}\bar{B}C+\bar{A}BC+ABC\\
&=\bar{A}B\bar{C}+\bar{A}\bar{B}C+BC\\
&=\overline{\overline{\bar{A}B\bar{C}}}+\overline{\overline{\bar{A}\bar{B}C}}+\overline{\overline{BC}}\\
&=\overline{(\overline{\bar{A}B\bar{C}})\,(\overline{\bar{A}\bar{B}C})\,(\overline{BC})} \qquad (3)
\end{aligned}
$$

Where:

A and B = binary digits used in addition and subtraction

C = carrying or borrowing from the preceding bit

S = sum or difference $Ca$ = carrying for addition $Cs$ = borrowing for subtractor Formation of a full adder/subtractor on the basis of the above-mentioned logical Formulas 1, 2 and 3 will result in the circuit arrangement of the prior art as shown in FIG. 2, which consists of a plurality of NAND gates each comprising diode transistor logic (D.T.L.). In this example of a logical circuit, the flip-flop circuit (F.F.) issues signals for performing carrying or borrowing from the preceding bit. Since this logical circuit is of the known type, description thereof is omitted. As is apparent from FIG. 2, said circuit has the drawback that it requires a large number of logical elements whose interconnection presents considerable difficulties.

To find common elements contained in the logical circuit of the prior art full adder/subtractor of FIG. 2, the aforementioned logical Formulas 1, 2 and 3 are rearranged as follows:

$$
\begin{aligned}
S&=\bar{A}\bar{B}C+A\bar{B}\bar{C}+\bar{A}B\bar{C}+ABC\\
&=C(\bar{A}\bar{B}+AB)+\bar{C}(A\bar{B}+\bar{A}B)
\end{aligned}
$$

Where:

$$
\begin{aligned}
\bar{A}\bar{B}+AB&=\bar{A}A+\bar{A}\bar{B}+BA+B\bar{B}\\
&=(\bar{A}+B)(A+\bar{B})\\
&=(\overline{A\bar{B}})(\overline{\bar{A}B})\\
&=\overline{A\bar{B}+\bar{A}B} \qquad (4)
\end{aligned}
$$

Therefore:

$$
S=C(\overline{A\bar{B}+\bar{A}B})+\bar{C}(A\bar{B}+\bar{A}B) \qquad (5)
$$

$$
\begin{aligned}
Ca&=AB\bar{C}+\bar{A}BC+A\bar{B}C+ABC\\
&=AB(C+\bar{C})+C(A\bar{B}+\bar{A}B)\\
&=AB+C(A\bar{B}+\bar{A}B) \qquad (6)
\end{aligned}
$$

$$
\begin{aligned}
Cs&=\bar{A}B\bar{C}+\bar{A}\bar{B}C+\bar{A}BC+ABC\\
&=\bar{A}B+C(\bar{A}\bar{B}+AB)\\
&=\bar{A}B+C(\overline{A\bar{B}+\bar{A}B}) \qquad (7)
\end{aligned}
$$

It will be apparent from the above Formulas 5, 6 and 7 that the logical formulas of S, $Ca$ and $Cs$ all include a term of $A\bar{B}+\bar{A}B$. Designating, therefore, said common term as X, these formulas may be expressed in the following simple form:

$$S=C\bar{X}+\bar{C}X \qquad (8)$$

$$Ca=CX+AB \qquad (9)$$

$$Cs=C\bar{X}+\bar{A}B \qquad (10)$$

Referring now to the input to the flip-flop circuit of the full adder/subtractor of FIG. 2, there results from the signals of $Ca$ and $Cs$ and operating signal $Op$ the following logical formula FC:

$$\overline{FC=\bar{O}pCa+OpCs} \qquad (11)$$

Substituting the Formulas 9 and 10 in the above Formula 11 upon consideration of the relationship represented by the formula 4, $$
\begin{aligned}
FC&=\overline{\bar{O}p(CX+AB)+Op(C\bar{X}+\bar{A}B)}\\
&=C(\overline{X\bar{O}p+\bar{X}Op})+B(A\bar{O}p+\bar{A}Op) \qquad (12)
\end{aligned}
$$

Here the terms $\bar{X}Op+X\bar{O}p$ and $A\bar{O}p+\bar{A}Op$, as well as the term $A\bar{B}+\bar{A}B$, may generally be expressed by the logical formula $\gamma=\alpha\bar{\beta}+\bar{\alpha}\beta$. It will be seen that there is included the logical formula $\gamma=\alpha\bar{\beta}+\alpha\bar{\beta}$ in all the formulas of S, $Ca$, $Cs$ and FC. A logical circuit involving said logical formula $\gamma=\alpha\bar{\beta}+\bar{\alpha}\beta$ is generally known as an exclusive OR circuit.

Figure 3:
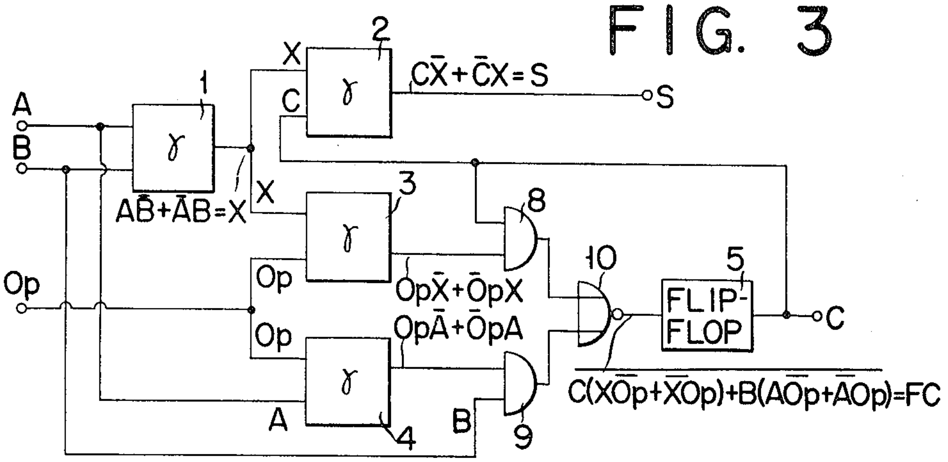
FIG. 3 shows the logical circuit of a full adder/subtractor according to the present invention.

FIG. 3 represents the embodiment of the present invention in which the logical formula $\gamma=\alpha\bar{\beta}+\bar{\alpha}\beta$ included in a full adder/subtractor is embodied in the form as described in the Formulas 5, 6, 7 and 12 and forming exclusive OR circuits, thereby preparing a full adder/subtractor.

Referring to FIG. 3, the input terminal of a first exclusive OR-circuit 1 is supplied with one-bit binary digital signals A and B. A corresponds to the added or subtracted number and B to the adding or subtracting number. From the output terminal of the first exclusive OR-circuit 1 there is issued a signal representing $A\bar{B}+\bar{A}B=X$. Said signal X is conducted to the input terminal of second and third exclusive OR-circuits 2 and 3. The operating signal $Op$ is supplied to the input terminal of the third and fourth exclusive OR-circuits 3 and 4. The negative form of the operating signal $Op$ acts as an addition-starting signal and the positive form thereof as a subtraction-starting signal. The positive signal is so set as to have a value of 0 volts and the negative signal to have a value approximating a source voltage, for example, −24 v. The input terminal of the second exclusive OR-circuit 2 is supplied with a signal C which was drawn out from a flip-flop circuit to be used in carrying or borrowing in the following stage. From the output terminal of said second exclusive OR-circuit 2 is drawn out a sum or difference signal representing $C\bar{X}+\bar{C}X=S$. From the third exclusive ORrcircuit 3 is issued a signal representing $Op\bar{X}+\bar{O}pX$. The input terminal of the fourth exclusive OR-circuit 4 is supplied with a signal A, and from the output terminal thereof is sent forth a signal of $Op\bar{A}+\bar{O}pA$. The signals C and $Op\bar{X}+\bar{O}pX$, and the signals $Op\bar{A}+\bar{O}pA$ and B are respectively conducted to a first and second AND-circuit 8 and 9 and then the output signals thereof to a first NOR-circuit 10 where they receive an OR logic to form a signal representing $C(X\bar{O}p+\bar{X}Op)+B(A\bar{O}p+\bar{A}Op)=FC$, which is in turn supplied to the input terminal of the flip-flop circuit 5. As a full adder/subtractor is formed of four exclusive OR circuits, one 2AND1OR circuit and one flip-flop circuit, there will be required only 14 gate elements, which means a substantial saving of such elements as compared with the prior art full adder/subtractor.

Each of the exclusive OR circuits of FIG. 3 has a truth table as shown by the table of FIG. 4, in which input binary digital signals are designated as $\alpha$ and $\beta$ and the output signal thereof as $\gamma$.

Figures 5, 6:
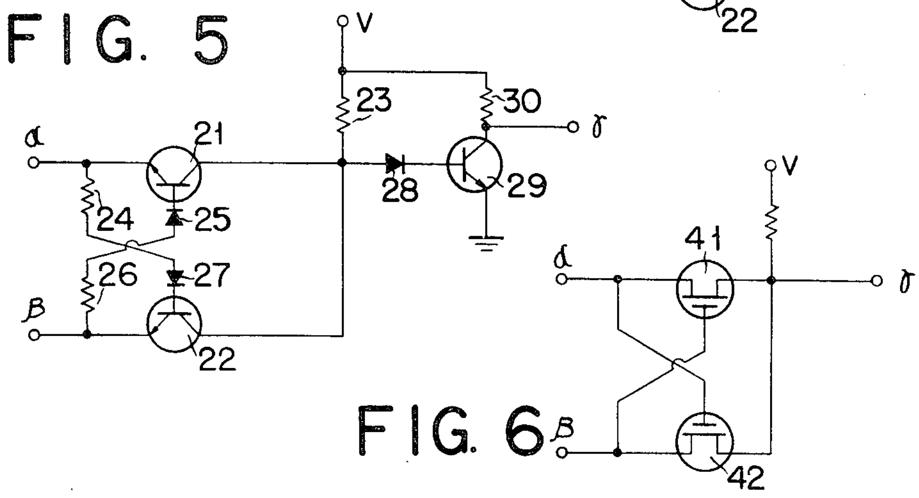
FIG. 5 is a concrete circuit diagram of a circuit using bipolar elements suitable for use as an exclusive AND or an exclusive OR circuit.
FIG. 6 is a concrete circuit diagram of a circuit using unipolar elements suitable for use as an exclusive AND or an exclusive OR circuit.

FIG. 5, when the source V is positive, such as +5 volts, is an exclusive OR circuit in which there are serially connected a second resistor 24 and a first diode 27 of the indicated polarity between the emitter of the first transistor 21 and the base of the second transistor 22, and also serially connected a third resistor 26 and a second diode 25 of the indicated polarity between the emitter of the second transistor 22 and the base of the first transistor 21. According to the exclusive OR circuit of FIG. 5, the first and second transistors 21 and 22 are furnished with an improved allowance for noises due to the action of the first and second diodes 25 and 27 connected to the base circuits of said transistors 21 and 22 respectively, leading to an elevated inverse withstanding voltage of the first transistor 21 and second transistor 22 so that the input signal is allowed to have a broad amplitude. Further, variations in the input properties of the transistors 21 and 22 are fully controlled by the second and third resistors 24 and 26 disposed in their base circuits, so that there takes place substantially no variation in the input properties of the entire circuit device. The output terminal is connected to the base of a third transistor 29 through a third diode 28 of the indicated polarity, the emitter of said third transistor 29 is directly grounded, the collector thereof is connected to a power source (not shown) through a fourth resistor 30 and there is drawn out an output $\gamma$ from the collector. According to the embodiment of FIG. 5, the third transistor 29 acts as an inverter. Further, the third diode 28 helps the entire circuit device to have an elevated allowance for noises. When the source V is negative, the circuit of FIG. 5 is converted for operation as an exclusive AND circuit.

Figure 7A:
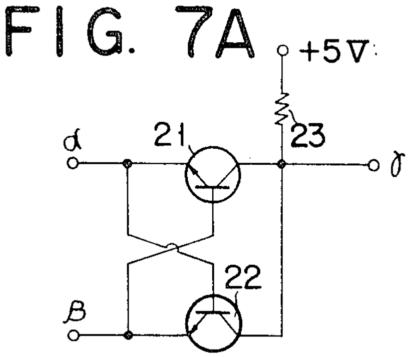
FIGS. 7A and 7B are concrete circuit diagrams of exclusive AND circuits using bipolar elements.
Figure 7B:
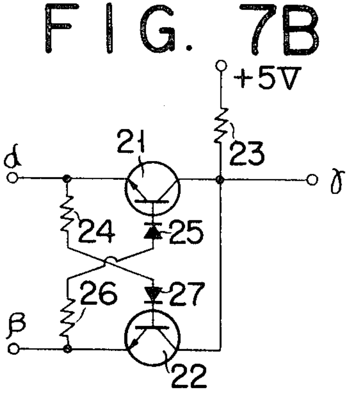

FIG. 6 is another embodiment of the present invention which, when the source V is negative, such as −24 volts, is an exclusive OR circuit formed of unipolar elements 41 and 42 such as metal oxide silicon field-effect transistors (MOS FET). Negative pulses of −9 to −24 v. are applied as input signals. The circuit of FIG. 6 is converted to an exclusive AND by making the source V a positive voltage. If a full adder/subtractor is formed into an integrated circuit by preparing an exclusive OR circuit from a unipolar element, it will not only make the entire circuit device simple, but will also allow high integration to be realized. FIGS. 7A and 7B illustrate exclusive AND circuits. Corresponding elements in FIGS. 5, 6, 7A and 7B are given the same reference numerals.

Figure 8:
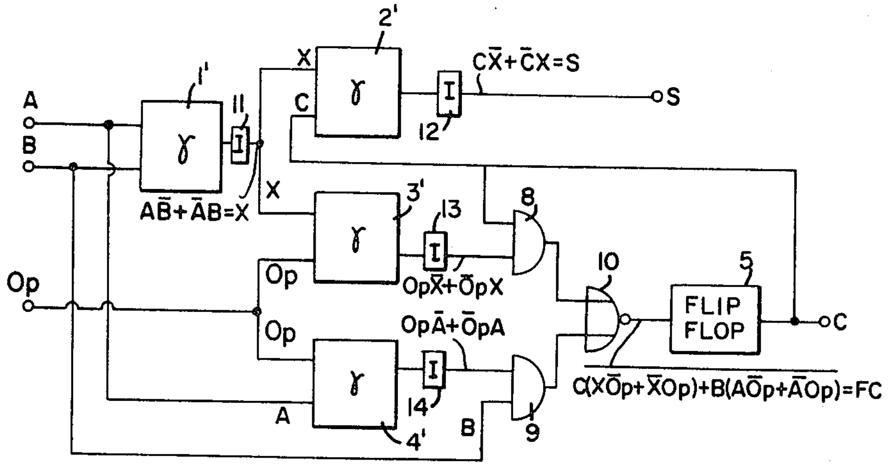
FIG. 8 shows the logical circuit of a full adder/subtractor according to the present invention using exclusive AND circuits and associated inverters.

By replacing the exclusive OR circuits of FIG. 3 with exclusive AND circuits and corresponding inverters, the full adder/subtractor can also be obtained as shown in FIG. 8. Exclusive AND-circuits 1′, 2′, 3′, and 4′ of FIG. 8 replace exclusive OR circuits of FIG. 3. Inverters 11–14 of FIG. 8 are respectively coupled to the outputs of circuits 1′–4′ to provide the proper outputs in accordance with the above-described formulas.

As mentioned above, the present invention enables mainly a full adder/subtractor to be made of a simple arrangement by drawing out a logical common element or $\gamma=\bar{\alpha}\bar{\beta}+\alpha\beta/\alpha\bar{\beta}+\bar{\alpha}\beta$ from the prior art logical operation circuit and preparing said adder/substractor from a simple logical circuit, namely, an exclusive AND/OR circuit corresponding to said common element. Accordingly, the invention has various advantageous effects, such as reducing the required number of logical elements, substantially reducing cost, and elevating operating reliability, thus providing a logical operation circuit device well adapted for assembling an electronic computer or the like.

What is claimed is:

1. A logical operation circuit device comprising:
   - a first exclusive AND circuit which is supplied with one-bit binary digital signals respectively corresponding to an added or subtracted number and an adding or subtracting number;
   - a first inverter coupled to the output of said first exclusive AND circuit;
   - a second exclusive AND circuit which is supplied with output signals from the first inverter and carrying or borrowing signals and issues signals which are a function of sum signals;
   - a second inverter coupled to the output of said second exclusive AND circuit and issuing sum signals;
   - a third exclusive AND circuit which is supplied with output signals from the first inverter and providing operating signals for starting addition or subtraction;
   - a third inverter coupled to the output of said third exclusive AND circuit;
   - a fourth exclusive AND circuit which is supplied with input signals corresponding to added or subtracted numbers and providing operating signals for starting addition or subtraction;
   - a fourth inverter coupled to the output of said fourth exclusive AND circuit;
   - a first AND circuit which is supplied with output signals from the third inverter and carrying or borrowing signals;
   - a second AND circuit which is supplied with output signals from the fourth inverter and receiving signals corresponding to the adding or subtracting signals;
   - a NOR circuit which is supplied with outputs from the first and second AND circuits; and
   - a flip-flop circuit energized by output signals from said NOR circuit to give forth carrying or borrowing signals.

2. A logical operation circuit device according to claim 1 comprising a source of power and wherein each exclusive AND circuit comprises:
   - first and second transistors, the respective emitters thereof being supplied with input signals, the emitter of each of said transistor being connected to the base of the other, and their collectors are connected together; and
   - a first resistor, one end of which is connected to the connecting point of the collectors of said first and second transistors and the other end of which is connected to said power source, an output signal being provided at the connecting point of said collectors and said first resistor.

3. A logical operation circuit device according to claim 2 wherein each exclusive AND circuit further comprises:
   - a serial connection of a second resistor and a first diode coupled between the emitter of the first transistor and the base of the second transistor; and
   - a serial connector of a third resistor and a second diode coupled between the emitter of the second transistors and the base of the first transistor.

4. A logical operation circuit device according to claim 3 wherein each exclusive AND circuit further comprises:
   - a third diode having its anode connected to the connecting point of the collectors of said first and second transistors;
   - a third transistor whose base is connected to the cathode of the third diode, whose emitter is directly grounded, and whose collector provides output signals; and
   - a fourth resistor connected between the collector of said third transistor and the power source.

5. A logical operation circuit device according to claim 1 wherein each exclusive AND circuit is formed of unipolar elements.

6. A logical operation circuit device comprising:

a first exclusive OR circuit which is supplied with one-bit binary digital signals respectively corresponding to an added or subtracted number and an adding or subtracting number;

a second exclusive OR circuit which is supplied with output signals from the first exclusive OR circuit and carrying or borrowing signals and issues sum signals;

a third exclusive OR circuit which is supplied with output signals from the first exclusive OR circuit and providing operating signals for starting addition or subtraction;

a fourth exclusive OR circuit which is supplied with input signals corresponding to added or subtracted numbers and providing operating signals for starting addition or subtraction;

a first AND circuit which is supplied with output signals from the third exclusive OR circuit and carrying or borrowing signals;

a second AND circuit which is supplied with output signals from the fourth exclusive OR circuit and receiving signals corresponding to the adding or subtracting signals;

a NOR circuit which is supplied with outputs from the first and second AND circuits; and a flip-flop circuit energized by output signals from said NOR circuit to give forth carrying or borrowing signals.

7. A logical operation circuit device according to claim 6 comprising a source of power and wherein each exclusive OR circuit comprises:

first and second transistors, the respective emitters thereof being supplied with input signals, the emitter of each of said transistor being connected to the base of the other, and their collectors are connected together; and a first resistor, one end of which is connected to the connecting point of the collectors of said first and second transistors and the other end of which is connected to said power source, an output signal being provided at the connecting point of said collectors and said first resistor.

8. A logical operation circuit device according to claim 7 wherein each exclusive OR circuit further comprises:

a serial connection of a second resistor and a first diode coupled between the emitter of the first transistor and the base of the second transistor; and a serial connection of a third resistor and a second diode coupled between the emitter of the second transistors and the base of the first transistor.

9. A logical operation circuit device according to claim 8 wherein each exclusive OR circuit further comprises:

a third diode having its anode connected to the connecting point of the collectors of said first and second transistors;

a third transistor whose base is connected to the cathode of the third diode, whose emitter is directly grounded, and whose collector provides output signals; and a fourth resistor connected between the collector of said third transistor and the power source.

10. A logical operation circuit device according to claim 6 wherein each exclusive OR circuit is formed of unipolar elements.

* * * * *